United States Patent
Moore et al.

(10) Patent No.: US 8,468,323 B2
(45) Date of Patent: Jun. 18, 2013

(54) CLOCKLESS COMPUTER USING A PULSE GENERATOR THAT IS TRIGGERED BY AN EVENT OTHER THAN A READ OR WRITE INSTRUCTION IN PLACE OF A CLOCK

(75) Inventors: Charles H. Moore, Sierra City, CA (US); Jeffrey Arthur Fox, Berkeley, CA (US); John W. Rible, Santa Cruz, CA (US)

(73) Assignee: ARRAY Portfolio LLC, Cupertino, CA (US)

( * ) Notice: Subject to any disclaimer, the term of this patent is extended or adjusted under 35 U.S.C. 154(b) by 81 days.

(21) Appl. No.: 13/053,062

(22) Filed: Mar. 21, 2011

(65) Prior Publication Data

US 2011/0179251 A1 Jul. 21, 2011

Related U.S. Application Data

(60) Division of application No. 11/441,812, filed on May 26, 2006, now Pat. No. 7,913,069, which is a continuation-in-part of application No. 11/355,513, filed on Feb. 16, 2006, now Pat. No. 7,904,695, application No. 13/053,062, which is a division of application No. 12/803,652, filed on Jul. 1, 2010, which is a division of application No. 11/441,784, filed on May 26, 2006, now Pat. No. 7,752,422, said application No. 13/053,062 is a division of application No. 11/441,818, filed on May 26, 2006, now Pat. No. 7,934,075.

(60) Provisional application No. 60/788,265, filed on Mar. 31, 2006, provisional application No. 60/797,345, filed on May 3, 2006.

(51) Int. Cl.
*G06F 15/00* (2006.01)
*G06F 15/76* (2006.01)
*G06F 7/38* (2006.01)
*G06F 1/00* (2006.01)

(52) U.S. Cl.
USPC .............................. 712/16; 712/220; 713/300

(58) Field of Classification Search
None
See application file for complete search history.

(56) References Cited

U.S. PATENT DOCUMENTS

| | | | | | |
|---|---|---|---|---|---|
| 4,295,193 | A | * | 10/1981 | Pomerene | 712/215 |
| 4,884,196 | A | * | 11/1989 | Thiel et al. | 711/169 |
| 4,910,671 | A | * | 3/1990 | Kitamura et al. | 714/47.1 |
| 2006/0259743 | A1 | * | 11/2006 | Suzuoki | 712/220 |

* cited by examiner

*Primary Examiner* — Andrew Caldwell
*Assistant Examiner* — William B Partridge
(74) *Attorney, Agent, or Firm* — Edward P. Heller, III

(57) ABSTRACT

A computer array (10) has a plurality of computers (12). The computers (12) communicate with each other asynchronously, and the computers (12) themselves operate in a generally asynchronous manner internally. When one computer (12) attempts to communicate with another it goes to sleep until the other computer (12) is ready to complete the transaction, thereby saving power and reducing heat production. The sleeping computer (12) can be awaiting data or instructions (12). In the case of instructions, the sleeping computer (12) can be waiting to store the instructions or to immediately execute the instructions. In the later case, the instructions are placed in an instruction register (30a) when they are received and executed therefrom, without first placing the instructions first into memory. The instructions can include a micro-loop (100) which is capable of performing a series of operations repeatedly. In one application, the sleeping computer (12) is awakened by an input such that it commences an action that would otherwise have required an interrupt of an otherwise active computer.

27 Claims, 8 Drawing Sheets

CLOCKLESS COMPUTER USING A PULSE GENERATOR THAT IS TRIGGERED BY AN EVENT OTHER THAN A READ OR WRITE INSTRUCTION IN PLACE OF A CLOCK

RELATED APPLICATIONS

This application is a division of U.S. application Ser. No. 11/441,812 (now U.S. Pat. No. 7,913,069) filed May 26, 2006 by at least one common inventor, which is a continuation-in-part of U.S. application Ser. No. 11/355,513 (now U.S. Pat. No. 7,904,695) filed Feb. 16, 2006 by at least one common inventor, and claims the benefit of provisional U.S. Application Ser. No. 60/788,265 filed Mar. 31, 2006 by at least one common inventor, and U.S. Application Ser. No. 60/797,345 filed May 3, 2006 by at least one common inventor, all of which are incorporated herein by reference in their entireties.

This application is also a division of co-pending U.S. application Ser. No. 12/803,652 filed Jul. 1, 2010 by at least one common inventor, which is a division of U.S. application Ser. No. 11/441,784 (now U.S. Pat. No. 7,752,422) filed May 26, 2006 by at least one common inventor, which is a continuation-in-part of U.S. application Ser. No. 11/355,513 (now U.S. Pat. No. 7,904,695) filed Feb. 16, 2006 by at least one common inventor, and claims the benefit of provisional U.S. Application Ser. No. 60/788,265 filed Mar. 31, 2006 by at least one common inventor, and U.S. Application Ser. No. 60/797,345 filed May 3, 2006 by at least one common inventor, all of which are incorporated herein by reference in their entireties.

This application is also a division of co-pending U.S. application Ser. No. 11/441,818 filed May 26, 2006 by at least one common inventor, which is a continuation-in-part of U.S. application Ser. No. 11/355,513 (now U.S. Pat. No. 7,904, 695) filed Feb. 16, 2006 by at least one common inventor, and claims the benefit of provisional U.S. Application Ser. No. 60/788,265 filed Mar. 31, 2006 by at least one common inventor, and U.S. Application Ser. No. 60/797,345 filed May 3, 2006 by at least one common inventor, all of which are incorporated herein by reference in their entireties.

BACKGROUND OF THE INVENTION

1. Field of the Invention

The present invention relates to the field of computers and computer processors, and more particularly to a method and means for allowing a computer to execute instructions as they are received from an external source without first storing said instruction, and an associated method for using that method and means to facilitate communications between computers and the ability of a computer to use the available resources of another computer. The predominant current usage of the present inventive direct execution method and apparatus is in the combination of multiple computers on a single microchip, wherein operating efficiency is important not only because of the desire for increased operating speed but also because of the power savings and heat reduction that are a consequence of the greater efficiency.

2. Description of the Background Art

In the art of computing, processing speed is a much desired quality, and the quest to create faster computers and processors is ongoing. However, it is generally acknowledged in the industry that the limits for increasing the speed in microprocessors are rapidly being approached, at least using presently known technology. Therefore, there is an increasing interest in the use of multiple processors to increase overall computer speed by sharing computer tasks among the processors.

The use of multiple processors tends to create a need for communication between the processors. Indeed, there may well be a great deal of communication between the processors, such that a significant portion of time is spent in transferring instructions and data there between. Where the amount of such communication is significant, each additional instruction that must be executed in order to accomplish it places an incremental delay in the process which, cumulatively, can be very significant. The conventional method for communicating instructions or data from one computer to another involves first storing the data or instruction in the receiving computer and then, subsequently, calling it for execution (in the case of an instruction) or for operation thereon (in the case of data).

It would be useful to reduce the number of steps required to transmit, receive, and then use information, in the form of data or instructions, between computers. However, to the inventor's knowledge no prior art system has streamlined the above described process in a significant manner.

Also, in the prior art it is known that it is necessary to "get the attention" of a computer from time to time. That is, sometimes even though a computer may be busy with one task, another time sensitive task requirement can occur that may necessitate temporarily diverting the computer away from the first task. Examples include, but are not limited to, instances where a user input device is used to provide input to the computer. In such cases, the computer might need to temporarily acknowledge the input and/or react in accordance with the input. Then, the computer will either continue what it was doing before the input or else change what it was doing based upon the input. Although an external input is used as an example here, the same situation occurs when there is a potential conflict for the attention of the arithmetic logic unit (ALU) between internal aspects of the computer, as well.

When receiving data and change in status from Input/Output (I/O) ports there have been two methods available in the prior art. One has been to "poll" the port, which involves reading the status of the port at fixed intervals to determine whether any data has been received or a change of status has occurred. However, polling the port consumes considerable time and resources which could usually be better used doing other things. A better alternative has often been the use of "interrupts". When using interrupts, a processor can go about performing its assigned task and then, when a I/O Port/Device needs attention as indicated by the fact that a byte has been received or status has changed, it sends an Interrupt Request (IRQ) to the processor. Once the processor receives an Interrupt Request, it finishes its current instruction, places a few things on the stack, and executes the appropriate Interrupt Service Routine (ISR) which can remove the byte from the port and place it in a buffer. Once the ISR has finished, the processor returns to where it left off. Using this method, the processor doesn't have to waste time, looking to see if the I/O Device is in need of attention, but rather the device will only service the interrupt when it needs attention. However, the use of interrupts, itself, is far less than desirable in many cases, since there can be a great deal of overhead associated with the use of interrupts. For example, each time an interrupt occurs, a computer may have to temporarily store certain data relating to the task it was previously trying to accomplish, then load data pertaining to the interrupt, and then reload the data necessary for the prior task once the interrupt is handled. Obviously, it would be desirable to reduce or eliminate all of this time and resource consuming overhead. However, no prior art method has been developed which has alleviated the need for interrupts.

SUMMARY

Accordingly, it is an object of the present invention to provide an apparatus and method for increasing the speed of operation where two or more computers are communicating data and/or instructions there between.

It is still another object of the present invention to provide an apparatus and method for providing substantial computing power inexpensively.

It is still another object of the present invention to provide an apparatus and method for accomplishing computationally intensive tasks in a minimal amount of time.

It is yet another object of the present invention to provide a computer device that produces a great amount of processing capability.

It is still another object of the present invention to increase the efficiency of communications between computers and computer controlled devices.

It is still another object of the present invention to increase the efficiency of communications between computers.

It is yet another object of the present invention to increase the efficiency of the manner in which computers communicate with each other and with the other devices, such as user input devices and the like.

Briefly, a known embodiment of the present invention is a computer having its own memory such that it is capable of independent computational functions. In one embodiment of the invention a plurality of the computers are arranged in an array. In order to accomplish tasks cooperatively, the computers must pass data and/or instructions from one to another. Since all of the computers working simultaneously will typically provide much more computational power than is required by most tasks, and since whatever algorithm or method that is used to distribute the task among the several computers will almost certainly result in an uneven distribution of assignments, it is anticipated that at least some, and perhaps most, of the computers may not be actively participating in the accomplishment of the task at any given time. Therefore, it would be desirable to find a way for under-used computers to be available to assist their busier neighbors by "lending" either computational resources, memory, or both. In order that such a relationship be efficient and useful it would further be desirable that communications and interaction between neighboring computers be as quick and efficient as possible. Therefore, the present invention provides a means and method for a computer to execute instructions and/or act on data provided directly from another computer, rather than having to receive and then store the data and/or instructions prior to such action. It will be noted that this invention will also be useful for instructions that will act as an intermediary to cause a computer to "pass on" instructions or data from one other computer to yet another computer.

In the embodiment described, in order to prevent unnecessary consumption of power and unnecessary production of heat, when a computer attempts to communicate with one or more of its neighbors it will be in a dormant mode consuming essentially no power until the neighbor or one of the neighbors acts to complete the communication. However, this is not a necessary aspect of the present invention. Furthermore, in order to accomplish the desired savings of power and reduced heat production it is desirable that the initiating computer cease, or at least significantly reduce, its power consumption while it is awaiting completion of the communication. It is conceivable that this could be accomplished by any of a number of means. For example, if the computer were timed by either an internal or an external clock, then that clock could be slowed or stopped during that period of time. Indeed, it is contemplated that such an embodiment may be implemented for reasons outside the scope of this invention, although the embodiment presently described is the best and most efficient embodiment now known to the inventor.

One aspect of the invention described herein is that instructions and data are treated essentially identically whether their source is the internal memory of the computer or else whether such instructions and data are being received from another source, such as another computer, an external communications port, or the like. This is significant because "additional" operations, such as storing the data or instructions and thereafter recalling them from internal memory becomes unnecessary, thereby reducing the number of instructions required and increasing the speed of operation of the computers involved.

Another aspect of the described embodiment is that very small groups of instructions can be communicated to another computer, generally simultaneously, such that relatively simple operations that require repetitive iterations can be quickly and easily accomplished. This will greatly expedite the process of communication between the computers.

Still another aspect of the described embodiment is that, since there are a quantity of computers available to perform various tasks, and since one or more computers can be placed in a dormant state wherein they use essentially no power while awaiting an input, such computers can be assigned the task of awaiting inputs, thereby reducing or eliminating the need to "interrupt" other computers that may be accomplishing other tasks.

These and other objects and advantages of the present invention will become clear to those skilled in the art in view of the description of modes of carrying out the invention, and the industrial applicability thereof, as described herein and as illustrated in the several figures of the drawing. The objects and advantages listed are not an exhaustive list of all possible advantages of the invention. Moreover, it will be possible to practice the invention even where one or more of the intended objects and/or advantages might be absent or not required in the application.

Further, those skilled in the art will recognize that various embodiments of the present invention may achieve one or more, but not necessarily all, of the described objects and/or advantages. Accordingly, the objects and/or advantages described herein are not essential elements of the present invention, and should not be construed as limitations.

DETAILED DESCRIPTION OF THE INVENTION

Figure 1:
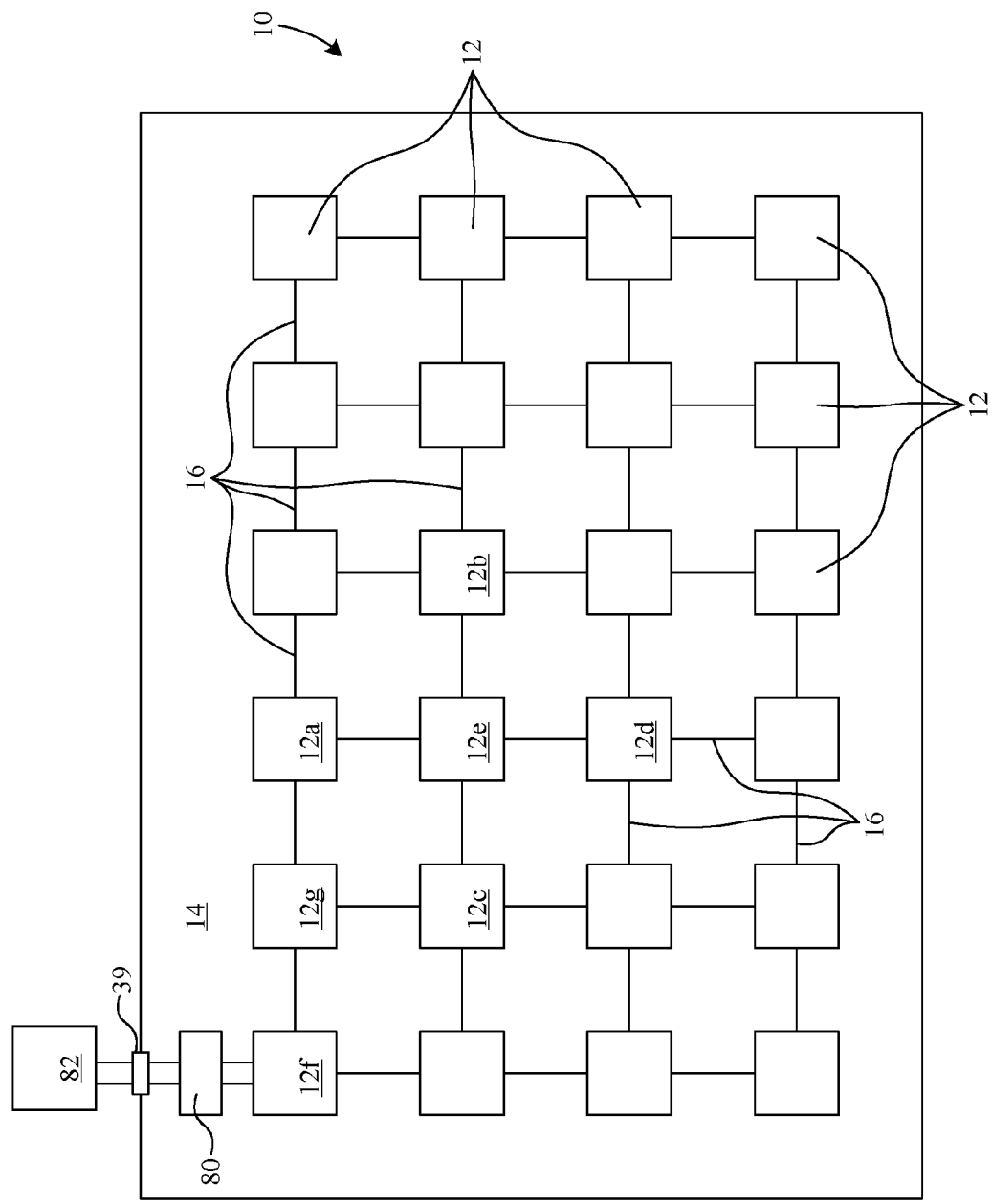
FIG. 1 is a diagrammatic view of a computer array, according to the present invention.

This invention is described in the following description with reference to the Figures, in which like numbers represent the same or similar elements. While this invention is described in terms of modes for achieving this invention's objectives, it will be appreciated by those skilled in the art that variations may be accomplished in view of these teachings without deviating from the spirit or scope of the present invention.

The embodiments and variations of the invention described herein, and/or shown in the drawings, are presented by way of example only and are not limiting as to the scope of the invention. Unless otherwise specifically stated, individual aspects and components of the invention may be omitted or modified, or may have substituted therefore known equivalents, or as yet unknown substitutes such as may be developed in the future or such as may be found to be acceptable substitutes in the future. The invention may also be modified for a variety of applications while remaining within the spirit and scope of the claimed invention, since the range of potential applications is great, and since it is intended that the present invention be adaptable to many such variations.

A known mode for carrying out the invention is an array of individual computers. The array is depicted in a diagrammatic view in FIG. 1 and is designated therein by the general reference character 10. The computer array 10 has a plurality (twenty four in the example shown) of computers 12 (sometimes also referred to as "cores" or "nodes" in the example of an array). In the example shown, all of the computers 12 are located on a single die 14. According to the present invention, each of the computers 12 is a generally independently functioning computer, as will be discussed in more detail hereinafter. The computers 12 are interconnected by a plurality (the quantities of which will be discussed in more detail hereinafter) of interconnecting data buses 16. In this example, the data buses 16 are bidirectional, asynchronous, high-speed, parallel data buses, although it is within the scope of the invention that other interconnecting means might be employed for the purpose. In the present embodiment of the array 10, not only is data communication between the computers 12 asynchronous, the individual computers 12 also operate in an internally asynchronous mode. This has been found by the inventor to provide important advantages. For example, since a clock signal does not have to be distributed throughout the computer array 10, a great deal of power is saved. Furthermore, not having to distribute a clock signal eliminates many timing problems that could limit the size of the array 10 or cause other known difficulties. Also, the fact that the individual computers operate asynchronously saves a great deal of power, since each computer will use essentially no power when it is not executing instructions, since there is no clock running therein.

One skilled in the art will recognize that there will be additional components on the die 14 that are omitted from the view of FIG. 1 for the sake of clarity. Such additional components include power buses, external connection pads, and other such common aspects of a microprocessor chip.

Computer 12e is an example of one of the computers 12 that is not on the periphery of the array 10. That is, computer 12e has four orthogonally adjacent computers 12a, 12b, 12c and 12d. This grouping of computers 12a through 12e will be used, by way of example, hereinafter in relation to a more detailed discussion of the communications between the computers 12 of the array 10. As can be seen in the view of FIG. 1, interior computers such as computer 12e will have four other computers 12 with which they can directly communicate via the buses 16. In the following discussion, the principles discussed will apply to all of the computers 12 except that the computers 12 on the periphery of the array 10 will be in direct communication with only three or, in the case of the corner computers 12, only two other of the computers 12.

Figure 2:
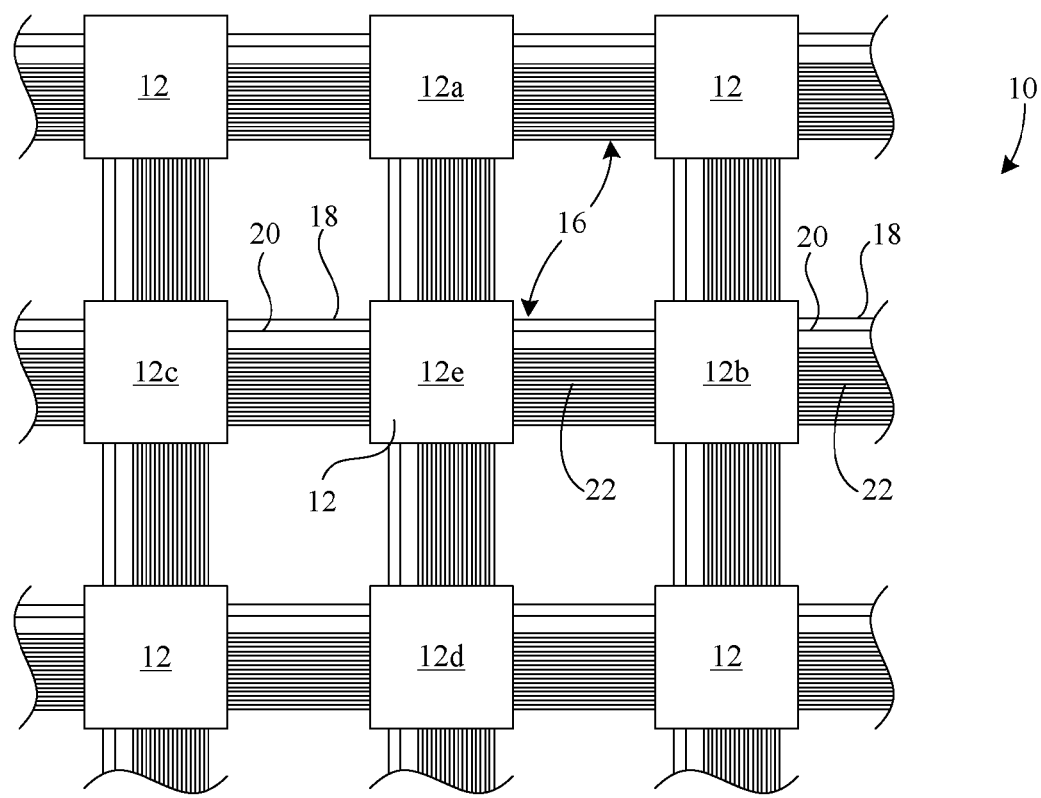
FIG. 2 is a detailed diagram showing a subset of the computers of FIG. 1 and a more detailed view of the interconnecting data buses of FIG. 1.

FIG. 2 is a more detailed view of a portion of FIG. 1 showing only some of the computers 12 and, in particular, computers 12a through 12e, inclusive. The view of FIG. 2 also reveals that the data buses 16 each have a read line 18, a write line 20 and a plurality (eighteen, in this example) of data lines 22. The data lines 22 are capable of transferring all the bits of one eighteen-bit instruction word generally simultaneously in parallel. It should be noted that, in one embodiment of the invention, some of the computers 12 are mirror images of adjacent computers. However, whether the computers 12 are all oriented identically or as mirror images of adjacent computers is not an aspect of this presently described invention. Therefore, in order to better describe this invention, this potential complication will not be discussed further herein.

According to the present inventive method, a computer 12, such as the computer 12e can set high one, two, three or all four of its read lines 18 such that it is prepared to receive data from the respective one, two, three or all four adjacent computers 12. Similarly, it is also possible for a computer 12 to set one, two, three or all four of its write lines 20 high. Although the inventor does not believe that there is presently any practical value to setting more than one of the write lines 20 of a computer 12 high at one time, doing so is not beyond the scope of this invention, as it conceivable that a use for such an operation may occur in the future.

When one of the adjacent computers 12a, 12b, 12c or 12d sets a write line 20 between itself and the computer 12e high, if the computer 12e has already set the corresponding read line 18 high, then a word is transferred from that computer 12a, 12b, 12c or 12d to the computer 12e on the associated data lines 22. Then, the sending computer 12 will release the write line 20 and the receiving computer (12e in this example) pulls both the write line 20 and the read line 18 low. The latter action will acknowledge to the sending computer 12 that the data has been received. Note that the above description is not intended necessarily to denote the sequence of events in order. In actual practice, the receiving computer may try to set the write line 20 low slightly before the sending computer 12 releases (stops pulling high) its write line 20. In such an instance, as soon as the sending computer 12 releases its write line 20 the write line 20 will be pulled low by the receiving computer 12e.

In the present example, only a programming error would cause both computers 12 on the opposite ends of one of the buses 16 to try to set high the read line 18 there-between. Also, it would be error for both computers 12 on the opposite ends of one of the buses 16 to try to set high the write line 18 there-between at the same time. Similarly, as discussed above, it is not currently anticipated that it would be desirable to have a single computer 12 set more than one of its four write lines 20 high. However, it is presently anticipated that there will be occasions wherein it is desirable to set different combinations of the read lines 18 high such that one of the computers 12 can be in a wait state awaiting data from the first one of the chosen computers 12 to set its corresponding write line 20 high.

In the example discussed above, computer 12e was described as setting one or more of its read lines 18 high before an adjacent computer (selected from one or more of the computers 12a, 12b, 12c or 12d) has set its write line 20 high. However, this process can certainly occur in the opposite order. For example, if the computer 12e were attempting to write to the computer 12a, then computer 12e would set the write line 20 between computer 12e and computer 12a to high. If the read line 18 between computer 12e and computer 12a has then not already been set to high by computer 12a, then computer 12e will simply wait until computer 12a does set that read line 20 high. Then, as discussed above, when both of a corresponding pair of write line 18 and read line 20 are high the data awaiting to be transferred on the data lines 22 is transferred. Thereafter, the receiving computer 12 (computer 12a, in this example) sets both the read line 18 and the write line 20 between the two computers (12e and 12a in this example) to low as soon as the sending computer 12e releases the write line 18.

Whenever a computer 12 such as the computer 12e has set one of its write lines 20 high in anticipation of writing it will simply wait, using essentially no power, until the data is "requested", as described above, from the appropriate adjacent computer 12, unless the computer 12 to which the data is to be sent has already set its read line 18 high, in which case the data is transmitted immediately. Similarly, whenever a computer 12 has set one or more of its read lines 18 to high in anticipation of reading it will simply wait, using essentially no power, until the write line 20 connected to a selected computer 12 goes high to transfer an instruction word between the two computers 12.

As discussed above, there may be several potential means and/or methods to cause the computers 12 to function as described. However, in this present example, the computers 12 so behave simply because they are operating generally asynchronously internally (in addition to transferring data there-between in the asynchronous manner described). That is, instructions are generally completed sequentially. When either a write or read instruction occurs, there can be no further action until that instruction is completed (or, perhaps alternatively, until it is aborted, as by a "reset" or the like). There is no regular clock pulse, in the prior art sense. Rather, a pulse is generated to accomplish a next instruction only when the instruction being executed either is not a read or write type instruction (given that a read or write type instruction would require completion, often by another entity) or else when the read or write type operation is, in fact, completed.

Figure 3:
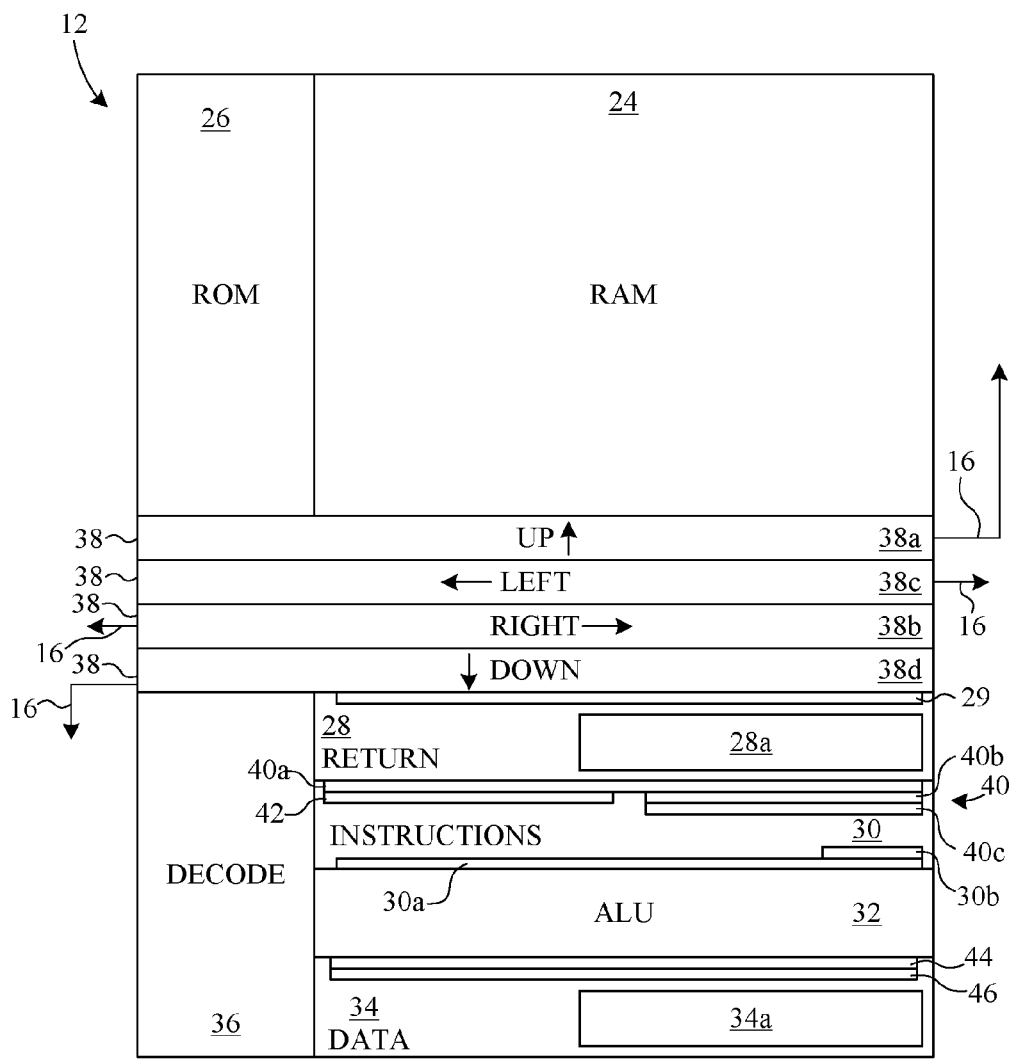
FIG. 3 is a block diagram depicting a general layout of one of the computers of FIGS. 1 and 2.

FIG. 3 is a block diagram depicting the general layout of an example of one of the computers 12 of FIGS. 1 and 2. As can be seen in the view of FIG. 3, each of the computers 12 is a generally self contained computer having its own random access memory (RAM) 24 and read only memory (ROM) 26. As mentioned previously, the computers 12 are also sometimes referred to as individual "nodes", given that they are, in the present example, combined on a single chip.

Other basic components of the computer 12 are a return stack 28 (including an R register 29, discussed hereinafter), an instruction area 30, an arithmetic logic unit ("ALU" or "processor") 32, a data stack 34 and a decode logic section 36 for decoding instructions. One skilled in the art will be generally familiar with the operation of stack based computers such as the computers 12 of this present example. The computers 12 are dual stack computers having the data stack 34 and the separate return stack 28.

In this embodiment of the invention, the computer 12 has four communication ports 38 for communicating with adjacent computers 12. The communication ports 38 are tri-state drivers, having an off status, a receive status (for driving signals into the computer 12) and a send status (for driving signals out of the computer 12) Of course, if the particular computer 12 is not on the interior of the array (FIG. 1) such as the example of computer 12e, then one or more of the communication ports 38 will not be used in that particular computer, at least for the purposes described above. However, those communication ports 38 that do abut the edge of the die 14 can have additional circuitry, either designed into such computer 12 or else external to the computer 12 but associated therewith, to cause such communication port 38 to act as an external I/O port 39 (FIG. 1). Examples of such external I/O ports 39 include, but are not limited to, universal serial bus (USB) ports, RS232 serial bus ports, parallel communications ports, analog to digital and/or digital to analog conversion ports, and many other possible variations. No matter what type of additional or modified circuitry is employed for this purpose, according to the presently described embodiment of the invention the method of operation of the "external" I/O ports 39 regarding the handling of instructions and/or data received there from will be alike to that described, herein, in relation to the "internal" communication ports 38. In FIG. 1 an "edge" computer 12f is depicted with associated interface circuitry 80 (shown in block diagrammatic form) for communicating through an external I/O port 39 with an external device 82.

In the presently described embodiment, the instruction area 30 includes a number of registers 40 including, in this example, an A register 40a, a B register 40b and a P register 40c. In this example, the A register 40a is a full eighteen-bit register, while the B register 40b and the P register 40c are nine-bit registers.

Although the invention is not limited by this example, the present computer 12 is implemented to execute native Forth language instructions. As one familiar with the Forth computer language will appreciate, complicated Forth instructions, known as Forth "words" are constructed from the native processor instructions designed into the computer. The collection of Forth words is known as a "dictionary". In other languages, this might be known as a "library". As will be described in greater detail hereinafter, the computer 12 reads eighteen bits at a time from RAM 24, ROM 26 or directly from one of the data buses 16 (FIG. 2). However, since in Forth most instructions (known as operand-less instructions) obtain their operands directly from the stacks 28 and 34, they are generally only five bits in length, such that up to four instructions can be included in a single eighteen-bit instruction word, with the condition that the last instruction in the group is selected from a limited set of instructions that require only three bits. (In the described embodiment, the two least significant bits of an instruction in the last position are assumed to be "01".) Also depicted in block diagrammatic form in the view of FIG. 3 is a slot sequencer 42.

In this embodiment of the invention, data stack 34 is a last-in-first-out stack for parameters to be manipulated by the ALU 32, and the return stack 28 is a last-in first-out stack for nested return addresses used by CALL and RETURN instructions. The return stack 28 is also used by PUSH, POP and NEXT instructions, as will be discussed in some greater detail, hereinafter. The data stack 34 and the return stack 28 are not arrays in memory accessed by a stack pointer, as in many prior art computers. Rather, the stacks 34 and 28 are an array of registers. The top two registers in the data stack 34 are a T register 44 and an S register 46. The remainder of the data stack 34 has a circular register array 34a having eight additional hardware registers therein numbered, in this example S$_2$ through S$_9$. One of the eight registers in the circular register array 34a will be selected as the register below the S register 46 at any time. The value in the shift register that selects the stack register to be below S cannot be read or written by software. Similarly, the top position in the return stack 28 is the dedicated R register 29, while the remainder of the return stack 28 has a circular register array 28a having twelve additional hardware registers therein (not specifically shown in the drawing) that are numbered, in this example R$_1$ through R$_{11}$.

In this embodiment of the invention, there is no hardware detection of stack overflow or underflow conditions. Generally, prior art processors use stack pointers and memory management, or the like, such that an error condition is flagged when a stack pointer goes out of the range of memory allocated for the stack. That is because, were the stacks located in memory an overflow or underflow would overwrite or use as a stack item something that is not intended to be part of the stack. However, because the present invention has the circular arrays 28a and 34a at the bottom on the stacks 28 and 34 the stacks 28 and 34 cannot overflow or underflow out of the stack area. Instead, the circular arrays 28a and 34a will merely wrap around the circular array of registers. Because the stacks 28 and 34 have finite depth, pushing anything to the top of a stack 28 or 34 means something on the bottom is being overwritten. Pushing more than ten items to the data stack 34, or more than thirteen items to the return stack 28 must be done with the knowledge that doing so will result in the item at the bottom of the stack 28 or 34 being overwritten. It is the responsibility of software to keep track of the number of items on the stacks 28 and 34 and not try to put more items there than the respective stacks 28 and 34 can hold. The hardware will not detect an overwriting of items at the bottom of the stack or flag it as an error. However, it should be noted that the software can take advantage of the circular arrays 28a and 34a at the bottom of the stacks 28 and 34 in several ways. As just one example, the software can simply assume that a stack 28 or 34 is 'empty' at any time. There is no need to clear old items from the stack as they will be pushed down towards the bottom where they will be lost as the stack fills. So there is nothing to initialize for a program to assume that the stack is empty.

In addition to the registers previously discussed herein, the instruction area 30 also has an 18 bit instruction register 30a for storing the instruction word 48 that is presently being used, and an additional 5 bit opcode register 30b for the instruction in the particular instruction presently being executed.

Figure 4:
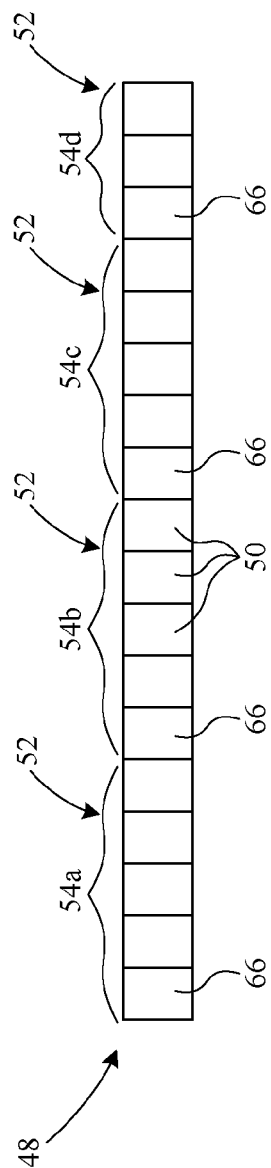
FIG. 4 is a diagrammatic representation of an instruction word according to the present inventive application.

FIG. 4 is a diagrammatic representation of an instruction word 48. (It should be noted that the instruction word 48 can actually contain instructions, data, or some combination thereof.) The instruction word 48 consists of eighteen bits 50. This being a binary computer, each of the bits 50 will be a '1' or a '0'. As previously discussed herein, the eighteen-bit wide instruction word 48 can contain up to four instructions 52 in four slots 54 called slot zero 54a, slot one 54b, slot two 54c and slot three 54d. In the present embodiment of the invention, the eighteen-bit instruction words 48 are always read as a whole. Therefore, since there is always a potential of having up to four instructions in the instruction word 48, a no operation (no-op) instruction is included in the instruction set of the computer 12 to provide for instances when using all of the available slots 54 might be unnecessary or even undesirable. It should be noted that, according to one particular embodiment of the invention, the polarity (active high as compared to active low) of bits 50 in alternate slots (specifically, slots one 54b and three 54c) is reversed. However, this is not a necessary aspect of the presently described invention and, therefore, in order to better explain this invention this potential complication is avoided in the following discussion.

Figure 5:
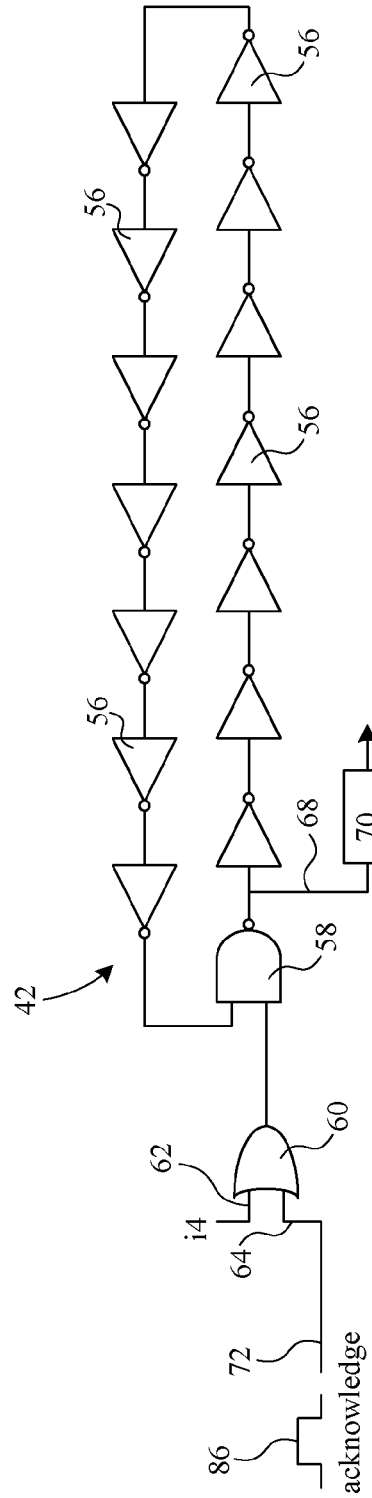
FIG. 5 is a schematic representation of the slot sequencer 42 of FIG. 3.

FIG. 5 is a schematic representation of the slot sequencer 42 of FIG. 3. As can be seen in the view of FIG. 5, the slot sequencer 42 has a plurality (fourteen in this example) of inverters 56 and one NAND gate 58 arranged in a ring, such that a signal is inverted an odd number of times as it travels through the fourteen inverters 56 and the NAND gate 58. A signal is initiated in the slot sequencer 42 when either of the two inputs to an OR gate 60 goes high. A first OR gate input 62 is derived from a bit i4 66 (FIG. 4) of the instruction 52 being executed. If bit i4 is high then that particular instruction 52 is an ALU instruction, and the i4 bit 66 is '1'. When the i4 bit is '1', then the first OR gate input 62 is high, and the slot sequencer 42 is triggered to initiate a pulse that will cause the execution of the next instruction 52.

When the slot sequencer 42 is triggered, either by the first OR gate input 62 going high or by the second OR gate input 64 going high (as will be discussed hereinafter), then a signal will travel around the slot sequencer 42 twice, producing an output at a slot sequencer output 68 each time. The first time the signal passes the slot sequencer output 68 it will be low, and the second time the output at the slot sequencer output 68 will be high. The relatively wide output from the slot sequencer output 68 is provided to a pulse generator 70 (shown in block diagrammatic form) that produces a narrow timing pulse as an output. One skilled in the art will recognize that the narrow timing pulse is desirable to accurately initiate the operations of the computer 12.

When the particular instruction 52 being executed is a read or a write instruction, or any other instruction wherein it is not desired that the instruction 52 being executed triggers immediate execution of the next instruction 52 in sequence, then the i4 bit 66 is '0' (low) and the first OR gate input 62 is, therefore, also low. One skilled in the art will recognize that the timing of events in a device such as the computers 12 is generally quite critical, and this is no exception. Upon examination of the slot sequencer 42 one skilled in the art will recognize that the output from the OR gate 60 must remain high until after the signal has circulated past the NAND gate 58 in order to initiate the second "lap" of the ring. Thereafter, the output from the OR gate 60 will go low during that second "lap" in order to prevent unwanted continued oscillation of the circuit.

As can be appreciated in light of the above discussion, when the i4 bit 66 is '0', then the slot sequencer 42 will not be triggered—assuming that the second OR gate input 66, which will be discussed hereinafter, is not high.

As discussed, above, the i4 bit 66 of each instruction 52 is set according to whether or not that instruction is a read or write type of instruction, as opposed to that instruction being one that requires no input or output. The remaining bits 50 in the instruction 52 provide the remainder of the particular opcode for that instruction. In the case of a read or write type instruction, one or more of the bits may be used to indicate where data is to be read from, or written to, in that particular computer 12. In the present example of the invention, data to be written always comes from the T register 44 (the top of the data stack 34), however data can be selectively read into either the T register 44 or else the instruction area 30 from where it can be executed. That is because, in this particular embodiment of the invention, either data or instructions can be communicated in the manner described herein and instructions can, therefore, be executed directly from the data bus 16.

One or more of the bits 50 will be used to indicate which of the ports 38, if any, is to be set to read or write. This later operation is optionally accomplished by using one or more bits to designate a register 40, such as the A register 40a, the B register 40b, or the like. In such an example, the designated register 40 will be preloaded with data having a bit corresponding to each of the ports 38 (and, also, any other potential entity with which the computer 12 may be attempting to communicate, such as memory (RAM 24 or ROM 26), an external communications port 39, or the like.) For example, each of four bits in the particular register 40 can correspond to each of the up port 38a, the right port 38b, the left port 38c or the down port 38d. In such case, where there is a '1' at any of those bit locations, communication will be set to proceed through the corresponding port 38. As previously discussed herein, in the present embodiment of the invention it is anticipated that a read opcode might set more than one port 38 for communication in a single instruction while, although it is possible, it is not anticipated that a write opcode will set more than one port 38 for communication in a single instruction.

The immediately following example will assume a communication wherein computer 12e is attempting to write to computer 12c, although the example is applicable to communication between any adjacent computers 12. When a write instruction is executed in a writing computer 12e, the selected write line 20 (in this example, the write line 20 between computers 12e and 12c) is set high, if the corresponding read line 18 is already high then data is immediately sent from the selected location through the selected communications port 38. Alternatively, if the corresponding read line 18 is not already high, then computer 12e will simply stop operation until the corresponding read line 18 does go high. The mechanism for stopping (or, more accurately, not enabling further operations of) the computer 12a when there is a read or write type instruction has been discussed previously herein. In short, the opcode of the instruction 52 will have a '0' at bit position i4 66, and so the first OR gate input 62 of the OR gate 60 is low, and so the slot sequencer 42 is not triggered to generate an enabling pulse.

As for how the operation of the computer 12e is resumed when a read or write type instruction is completed, the mechanism for that is as follows: When both the read line 18 and the corresponding write line 20 between computers 12e and 12c are high, then both lines 18 and 20 will released by each of the respective computers 12 that is holding it high. (In this example, the sending computer 12e will be holding the write line 18 high while the receiving computer 12c will be holding the read line 20 high). Then the receiving computer 12c will pull both lines 18 and 20 low. In actual practice, the receiving computer 12c may attempt to pull the lines 18 and 20 low before the sending computer 12e has released the write line 18. However, since the lines 18 and 20 are pulled high and only weakly held (latched) low, any attempt to pull a line 18 or 20 low will not actually succeed until that line 18 or 20 is released by the computer 12 that is holding it high.

When both lines 18 and 20 in a data bus 16 are pulled low, this is an "acknowledge" condition. Each of the computers 12e and 12c will, upon the acknowledge condition, set its own internal acknowledge line 72 high. As can be seen in the view of FIG. 5, the acknowledge line 72 provides the second OR gate input 64. Since an input to either of the OR gate 60 inputs 62 or 64 will cause the output of the OR gate 60 to go high, this will initiate operation of the slot sequencer 42 in the manner previously described herein, such that the instruction 52 in the next slot 54 of the instruction word 48 will be executed. The acknowledge line 72 stays high until the next instruction 52 is decoded, in order to prevent spurious addresses from reaching the address bus.

In any case when the instruction 52 being executed is in the slot three position of the instruction word 48, the computer 12 will fetch the next awaiting eighteen-bit instruction word 48 unless, of course, bit i4 66 is a '0' or, also, unless the instruction in slot three is a "next" instruction, which will be discussed in more detail hereinafter.

In actual practice, the present inventive mechanism includes a method and apparatus for "prefetching" instructions such that the fetch can begin before the end of the execution of all instructions 52 in the instruction word 48. However, this also is not a necessary aspect of the presently described invention.

The above example wherein computer 12e is writing to computer 12c has been described in detail. As can be appreciated in light of the above discussion, the operations are essentially the same whether computer 12e attempts to write to computer 12c first, or whether computer 12c first attempts to read from computer 12e. The operation cannot be completed until both computers 12e and 12c are ready, and whichever computer 12e or 12c is ready first simply "goes to sleep" until the other computer 12e or 12c completes the transfer. Another way of looking at the above described process is that, actually, both the writing computer 12e and the receiving computer 12c go to sleep when they execute the write and read instructions, respectively, but the last one to enter into the transaction reawakens nearly instantaneously when both the read line 18 and the write line 20 are high, whereas the first computer 12 to initiate the transaction can stay asleep nearly indefinitely until the second computer 12 is ready to complete the process.

The inventor believes that a key feature for enabling efficient asynchronous communications between devices is some sort of acknowledge signal or condition. In the prior art, most communication between devices has been clocked and there is no direct way for a sending device to know that the receiving device has properly received the data. Methods such as checksum operations may have been used to attempt to insure that data is correctly received, but the sending device has no direct indication that the operation is completed. The present inventive method, as described herein, provides the necessary acknowledge condition that allows, or at least makes practical, asynchronous communications between the devices. Furthermore, the acknowledge condition also makes it possible for one or more of the devices to "go to sleep" until the acknowledge condition occurs. Of course, an acknowledge condition could be communicated between the computers 12 by a separate signal being sent between the computers 12 (either over the interconnecting data bus 16 or over a separate signal line), and such an acknowledge signal would be within the scope of this aspect of the present invention. However, according to the embodiment of the invention described herein, it can be appreciated that there is even more economy involved here, in that the method for acknowledgement does not require any additional signal, clock cycle, timing pulse, or any such resource beyond that described, to actually effect the communication.

Figure 6:
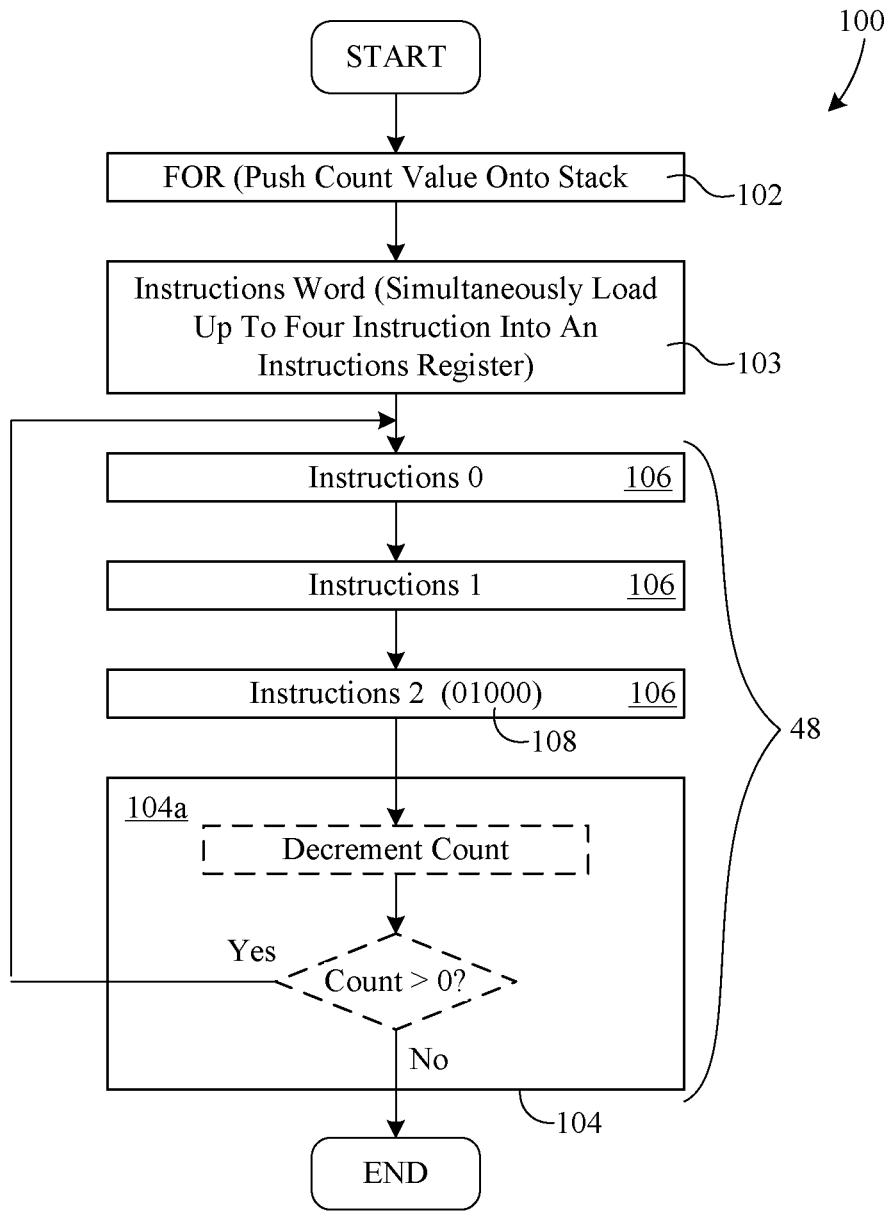
FIG. 6 is a flow diagram depicting an example of a microloop according to the present invention.

Since four instructions 52 can be included in an instruction word 48 and since, according to the present invention, an entire instruction word 48 can be communicated at one time between computers 12, this presents an ideal opportunity for transmitting a very small program in one operation. For example most of a small "For/Next" loop can be implemented in a single instruction word 48. FIG. 6 is a diagrammatic representation of a micro-loop 100. The micro-loop 100, not unlike other prior art loops, has a FOR instruction 102 and a NEXT instruction 104. Since an instruction word 48 (FIG. 4) contains as many as four instructions 52, an instruction word 48 can include three operation instructions 106 within a single instruction word 48. The operation instructions 106 can be essentially any of the available instructions that a programmer might want to include in the micro-loop 100. A typical example of a micro-loop 100 that might be transmitted from one computer 12 to another might be a set of instructions for reading from, or writing to the RAM 24 of the second computer 12, such that the first computer 12 could "borrow" available RAM 24 capacity.

The FOR instruction 102 pushes a value onto the return stack 28 representing the number of iterations desired. That is, the value on the T register 44 at the top of the data stack 34 is PUSHed into the R register 29 of the return stack 28. The FOR instruction 102, while often located in slot three 54d of an instruction word 48 can, in fact, be located in any slot 54. Where the FOR instruction 102 is not located in slot three 54d, then the remaining instructions 52 in that instruction word 48 will be executed before going on to the micro-loop 100, which will generally be the next loaded instruction word 103 that includes a NEXT instruction 104 and three operation instructions 106.

According to the presently described embodiment of the invention, the NEXT instruction 104 depicted in the view of FIG. 6 is a particular type of NEXT instruction 104. This is because it is located in slot three 54d (FIG. 4). According to this embodiment of the invention, it is assumed that all of the data in a particular instruction word 40 that follows an "ordinary" NEXT instruction (not shown) is an address (the address where the for/next loop begins). The opcode for the NEXT instruction 104 is the same, no matter which of the four slots 54 it is in (with the obvious exception that the first two digits are assumed if it is slot three 54d, rather than being explicitly written, as discussed previously herein). However, since there can be no address data following the NEXT instruction 104 when it is in slot three 54d, it can be also assumed that the NEXT instruction 104 in slot three 54d is a MICRO-NEXT instruction 104a. The MICRO-NEXT instruction 104a uses the address of the first instruction 52, located in slot zero 54a of the same instruction word 48 in which it is located, as the address to which to return. The MICRO-NEXT instruction 104a also takes the value from the R register 29 (which was originally PUSHed there by the FOR instruction 102), decrements it by 1, and then returns it to the R register 29. When the value on the R register 29 reaches a predetermined value (such as zero), then the MICRO-NEXT instruction will load the next instruction word 48 and continue on as described previously herein. However, when the MICRO-NEXT instruction 104a reads a value from the R register 29 that is greater than the predetermined value, it will resume operation at slot zero 54a of its own instruction word 48 and execute the three instructions 52 located in slots zero through three, inclusive, thereof. That is, a MICRO-NEXT instruction 104a will always, in this embodiment of the invention, execute three operation instructions 106. Because, in some instances, it may not be desired to use all three potentially available instructions 52, a "no-op" instruction is available to fill one or two of the slots 54, as required.

It should be noted that micro-loops 100 can be used entirely within a single computer 12. Indeed, the entire set of available machine language instructions is available for use as the operation instructions 106, and the application and use of micro-loops is limited only by the imagination of the programmer. However, when the ability to execute an entire micro-loop 100 within a single instruction word 48 is combined with the ability to allow a computer 12 to send the instruction word 48 to a neighbor computer 12 to execute the instructions 52 therein essentially directly from the data bus 16, this provides a powerful tool for allowing a computer 12 to utilize the resources of its neighbors.

The small micro-loop 100, all contained within the single data word 48, can be communicated between computers 12, as described herein and it can be executed directly from the communications port 38 of the receiving computer 12, just like any other set of instructions contained in a instruction word 48, as described herein. While there are many uses for this sort of "micro-loop" 100, a typical use would be where one computer 12 wants to store some data onto the memory of a neighbor computer 12. It could, for example, first send an instruction to that neighbor computer telling it to store a incoming data word to a particular memory address, then increment that address, then repeat for a given number of iterations (the number of data words to be transmitted). To read the data back, the first computer would just instruct the second computer (the one used for storage here) to write the stored data back to the first computer, using a similar micro-loop.

By using the micro-loop 100 structure in conjunction with the direct execution aspect described herein, a computer 12 can use an otherwise resting neighbor computer 12 for storage of excess data when the data storage need exceeds the relatively small capacity built into each individual computer 12. While this example has been described in terms of data storage, the same technique can equally be used to allow a computer 12 to have its neighbor share its computational resources—by creating a micro-loop 100 that causes the other computer 12 to perform some operations, store the result, and repeat a given number of times. As can be appreciated, the number of ways in which this inventive micro-loop 100 structure can be used is nearly infinite.

As previously mentioned herein, in the presently described embodiment of the invention, either data or instructions can be communicated in the manner described herein and instructions can, therefore, be executed essentially directly from the data bus 16. That is, there is no need to store instructions to RAM 24 and then recall them before execution. Instead, according to this aspect of the invention, an instruction word 48 that is received on a communications port 38 is not treated essentially differently than it would be were it recalled from RAM 24 or ROM 26. While this lack of a difference is revealed in the prior discussion, herein, concerning the described operation of the computers 12, the following more specific discussion of how instruction words 48 are fetched and used will aid in the understanding of the invention.

One of the available machine language instructions is a FETCH instruction. The FETCH instruction uses the address on the A register 40a to determine from where to fetch an 18 bit word. Of course, the program will have to have already provided for placing the correct address on the A register 40a. As previously discussed herein, the A register 40a is an 18 bit register, such that there is a sufficient range of address data available that any of the potential sources from which a fetch can occur can be differentiated. That is, there is a range of addresses assigned to ROM, a different range of addresses assigned to RAM, and there are specific addresses for each of the ports 38 and for the external I/O port 39. A FETCH instruction always places the 18 bits that it fetches on the T register 44.

In contrast, as previously discussed herein, executable instructions (as opposed to data) are temporarily stored in the instruction register 30a. There is no specific command for "fetching" an 18 bit instruction word 48 into the instruction register 30a. Instead, when there are no more executable instructions left in the instruction register 30a, then the computer will automatically fetch the "next" instruction word 48.

Where that "next" instruction word is located is determined by the "program counter" (the P register 40c). The P register 40c is often automatically incremented, as is the case where a sequence of instruction words 48 is to be fetched from RAM 24 or ROM 26. However, there are a number of exceptions to this general rule. For example, a JUMP or CALL instruction will cause the P register 40c to be loaded with the address designated by the data in the remainder of the presently loaded instruction word 48 after the JUMP or CALL instruction, rather than being incremented. When the P register 40c is then loaded with an address corresponding to one or more of the ports 38, then the next instruction word 48 will be loaded into the instruction register 30a from the ports 38. The P register 40c also does not increment when an instruction word 48 has just been retrieved from a port 38 into the instruction register 30a. Rather, it will continue to retain that same port address until a specific JUMP or CALL instruction is executed to change the P register 40c. That is, once the computer 12 is told to look for its next instruction from a port 38, it will continue to look for instructions from that same port 38 (or ports 38) until it is told to look elsewhere, such as back to the memory (RAM 24 or ROM 26) for its next instruction word 48.

As noted above, the computer 12 knows that the next eighteen bits fetched is to be placed in the instruction register 30a when there are no more executable instructions left in the present instruction word 48. By default, there are no more executable instructions left in the present instruction word 48 after a JUMP or CALL instruction (or also after certain other instructions that will not be specifically discussed here) because, by definition, the remainder of the 18 bit instruction word following a JUMP or CALL instruction is dedicated to the address referred to by the JUMP or CALL instruction. Another way of stating this is that the above described processes are unique in many ways, including but not limited to the fact that a JUMP or CALL instruction can, optionally, be to a port 38, rather than to just a memory address, or the like.

It should be remembered that, as discussed previously herein, the computer 12 can look for its next instruction from one port 38 or from any of a group of the ports 38. Therefore, addresses are provided to correspond to various combinations of the ports 38. When, for example, a computer is told to fetch an instruction from a group of ports 38, then it will accept the first available instruction word 48 from any of the selected ports 38. If no neighbor computer 12 has already attempted to write to any of those ports 38, then the computer 12 in question will "go to sleep", as described in detail above, until a neighbor does write to the selected port 38.

Figure 7:
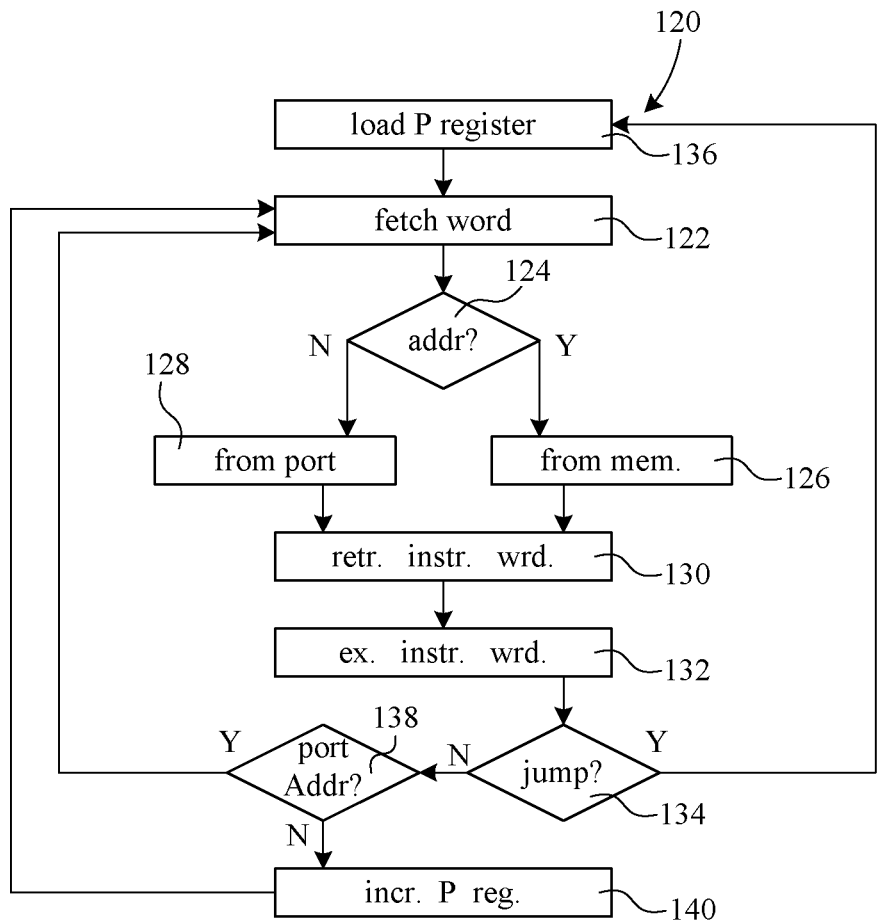
FIG. 7 is a flow diagram depicting an example of the inventive method for executing instructions from a port.

FIG. 7 is a flow diagram depicting an example of the above described direct execution method 120. A "normal" flow of operations will commence when, as discussed previously herein, there are no more executable instructions left in the instruction register 30a. At such time, the computer 12 will "fetch" another instruction word (note that the term "fetch" is used here in a general sense, in that an actual FETCH instruction is not used), as indicated by a "fetch word" operation 122. That operation will be accomplished according to the address in the P register 40c as indicated by an "address" decision operation 124 in the flow diagram of FIG. 7. If the address in the P register 40c is a RAM 24 or ROM 26 address, then the next instruction word 48 will be retrieved from the designated memory location in a "fetch from memory" operation 126. If, on the other hand, the address in the P register 40c is that of a port 38 or ports 38 (not a memory address) then the next instruction word 48 will be retrieved from the designated port location in a "fetch from port" operation 128. In either case, the instruction word 48 being retrieved is placed in the instruction register 30c in a "retrieve instruction word" operation 130. In an "execute instruction word" operation 132, the instructions in the slots 54 of the instruction word 48 are accomplished sequentially, as described previously herein.

In a "jump" decision operation 134 it is determined if one of the operations in the instruction word 48 is a JUMP instruction, or other instruction that would divert operation away from the continued "normal" progression as discussed previously herein. If yes, then the address provided in the instruction word 48 after the JUMP (or other such) instruction is provided to the P register 40c in a "load P register" operation 136, and the sequence begins again in the "fetch word" operation 122, as indicated in the diagram of FIG. 7. If no, then the next action depends upon whether the last instruction fetch was from a port 38 or from a memory address, as indicated in a "port address" decision operation 138. If the last instruction fetch was from a port 38, then no change is made to the P register 30a and the sequence is repeated starting with the "fetch word" operation 122. If, on the other hand, the last instruction fetch was from a memory address (RAM 24 or ROM 26), then the address in the P register 30a is incremented, as indicated by an "increment P register" operation 140 in FIG. 7, before the "fetch word" operation 122 is accomplished.

The above description is not intended to represent actual operational steps. Instead, it is a diagram of the various decisions and operations resulting there from that are performed according to the described embodiment of the invention. Indeed, this flow diagram should not be understood to mean that each operation described and shown requires a separate distinct sequential step. In fact many of the described operations in the flow diagram of FIG. 7 will, in practice, be accomplished generally simultaneously.

Figure 8:
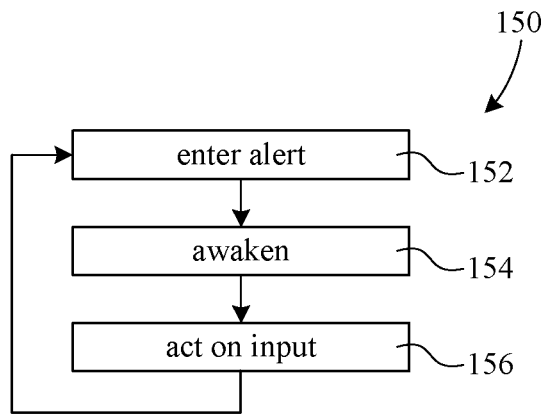
FIG. 8 is a flow diagram depicting an example of the inventive improved method for alerting a computer.

FIG. 8 is a flow diagram depicting an example of the inventive improved method for alerting a computer. As previously discussed herein, the computers 12 of the embodiment described will "go to sleep" while awaiting an input. Such an input can be from a neighboring computer 12, as in the embodiment described in relation to FIGS. 1 through 5. Alternatively, as was also discussed previously herein, the computers 12 that have communication ports 38 that abut the edge of the die 14 can have additional circuitry, either designed into such computer 12 or else external to the computer 12 but associated therewith, to cause such communication port 38 to act as an external I/O port 39. In either case, the inventive combination can provide the additional advantage that the "sleeping" computer 12 can be poised and ready to awaken and spring into some prescribed action when an input is received. Therefore, this invention also provides an alternative to the use of interrupts to handle inputs, whether such inputs come from an external input device, or from another computer 12 in the array 10.

Instead of causing a computer 12 to have to stop (or pause) what it is doing in order to handle an interrupt, the inventive combination described herein will allow for a computer 12 to be in an "asleep but alert" state, as described above. Therefore, one or more computers 12 can be assigned to receive and act upon certain inputs. While there are numerous ways in which this feature might be used, an example that will serve to illustrate just one such "computer alert method" is illustrated in the view of FIG. 8 and is enumerated therein by the reference character 150. As can be seen in the view of FIG. 8, in an "enter alert state" operation 152, a computer 12 is caused to "go to sleep" such that it is awaiting input from an neighbor computer 12, or more than one (as many as all four) neighbor computers or, in the case of a "edge" computer 12 an external input, or some combination of external inputs and/or inputs from a neighbor computer 12. As described previously herein, a computer 12, can "go to sleep" awaiting completion of either a read or a write operation. Where the computer 12 is being used, as described in this example, to await some possible "input", then it would be natural to assume that the waiting computer has set its read line 18 high awaiting a "write" from the neighbor or outside source. Indeed, it is presently anticipated that this will be the usual condition. However, it is within the scope of the invention that the waiting computer 12 will have set its write line 20 high and, therefore, that it will be awakened when the neighbor or outside source "reads" from it.

In an "awaken" operation 154, the sleeping computer 12 is caused to resume operation because the neighboring computer 12 or external device 39 has completed the transaction being awaited. If the transaction being awaited was the receipt of an instruction word 48 to be executed, then the computer 12 will proceed to execute the instructions therein. If the transaction being awaited was the receipt of data, then the computer 12 will proceed to execute the next instruction in queue, which will be either the instruction in the next slot 54 in the present instruction word 48, or else the next instruction word 48 will be loaded and the next instruction will be in slot 0 of that next instruction word 48. In any case, while being used in the described manner, then that next instruction will begin a sequence of one or more instructions for handling the input just received. Options for handling such input can include reacting to perform some predefined function internally, communicating with one or more of the other computers 12 in the array 10, or even ignoring the input (just as conventional prior art interrupts may be ignored under prescribed conditions). The options are depicted in the view of FIG. 8 as an "act on input" operation 156. It should be noted that, in some instances, the content of the input may not be important. In some cases, for example, it may be only the very fact that an external device has attempted communication that is of interest. If the computer 12 is assigned the task of acting as an "alert" computer, in the manner depicted in FIG. 8, then it will generally return to the "asleep but alert" status, as indicated in FIG. 8. However, the option is always open to assign the computer 12 some other task, such as when it is no longer necessary to monitor the particular input or inputs there being monitored, or when it is more convenient to transfer that task to some other of the computers 12 in the array.

One skilled in the art will recognize that this above described operating mode will be useful as a more efficient alternative to the conventional use of interrupts. When a computer 12 has one or more of its read lines 18 (or a write line 20) set high, it can be said to be an "alert" condition. In the alert condition, the computer 12 is ready to immediately execute any instruction sent to it on the data bus 16 corresponding to the read line or lines 18 that are set high or, alternatively, to act on data that is transferred over the data bus 16. Where there is an array of computers 12 available, one or more can be used, at any given time, to be in the above described alert condition such that any of a prescribed set of inputs will trigger it into action. This is preferable to using the conventional interrupt technique to "get the attention" of a computer, because an interrupt will cause a computer to have to store certain data, load certain data, and so on, in response to the interrupt request. While, according to the present invention, a computer can be placed in the alert condition and dedicated to awaiting the input of interest, such that not a single instruction period is wasted in beginning execution of the instructions triggered by such input. Again, note that in the presently described embodiment, computers in the alert condition will actually be "asleep but alert", meaning that they are "asleep" in the sense that they are using essentially no power, but "alert" in that they will be instantly triggered into action by an input. However, it is within the scope of this aspect of the invention that the "alert" condition could be embodied in a computer even if it were not "asleep". The described alert condition can be used in essentially any situation where a conventional prior art interrupt (either a hardware interrupt or a software interrupt) might have otherwise been used.

Figure 9:
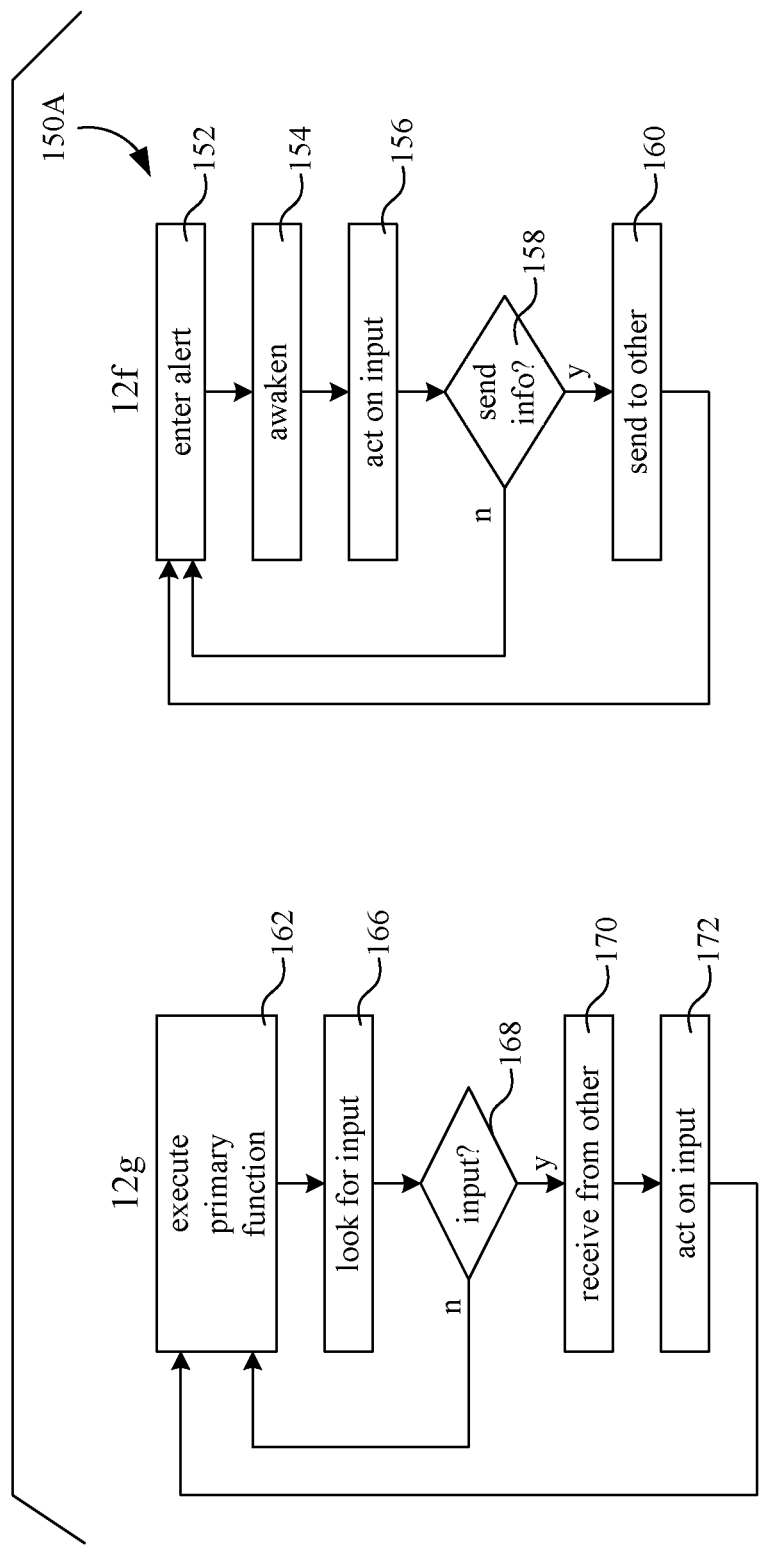
FIG. 9 is a flow diagram depicting another example of an inventive method for alerting a computer.

FIG. 9 is another example of a computer alert method 150a. This is but one example wherein interaction between a monitoring computer 12f (FIG. 1) and another computer 12g (FIG. 1) that is assigned to some other task may be desirable or necessary. As can be seen in the view of FIG. 9, there are two generally independent flow charts, one for each of the computers 12f and 12g. This is indicative of the nature of the cooperative coprocessor approach of the present invention, wherein each of the computers 12 has its own assignment which it carries out generally independently, except for occasions when interaction is accomplished as described herein.

Regarding the computer 12f, the "enter alert status" operation 152, the "awaken" operation 154 and the "act on input" operation each are accomplished as described previously herein in relation to the first example of the computer alert method 150. However, because this example anticipates a possible need for interaction between the computers 12f and 12g, then following the "act on input" operation 156, the computer 12f enters a "send info?" decision operation 158 wherein, according to its programming, it is determined if the input just received requires the attention of the other computer 12g. If no, then the computer 12f returns to alert status, or some other alternative such as was discussed previously herein. If yes, then the computer 12f initiates communication with the computer 12g as described in detail previously herein in a "send to other" operation 160. It should be noted that, according to the choice of the programmer, the computer 12f could be sending instructions such as it may have generated internally in response to the input from the external device 82 or such as it may have received from the external device 82. Alternatively, the computer 12f could pass on data to the computer 12g and such data could be internally generated in computer 12f or else "passed through" from the external device 82. Still another alternative might be that the computer 12f, in some situations, might attempt to read from the computer 12g when it receives an input from the external device 82. All of these opportunities are available to the programmer.

Meanwhile, the computer 12g is generally executing code to accomplish its assigned primary task, whatever that might be, as indicated in an "execute primary function" operation 162. However, if the programmer has decided that occasional interaction between the computers 12f and 12g is desirable, then the programmer will have provided that the computer 12g occasionally pause to see if one or more of its neighbors has attempted a communication, as indicated in a "look for input" operation 166. As indicated by an "input?" decision operation 168, if there is a communication waiting (as, for example, if the computer 12f has already initiated a write to the computer 12g). If there has been a communication initiated (yes) then the computer 12g will complete the communication, as described in detail previously herein, in a "receive from other" operation 170. If no, then the computer 12g will return to the execution of its primary function 162, as shown in FIG. 9. After the "receive from other" operation 170, the computer 12g will act on the input received in an "act on input" operation 172. As mentioned above, the programmer could have provided that the computer 12g would be expecting instructions as an input, in which case the computer 12g would execute the instructions as described previously herein. Alternatively, the computer 12g might be programmed to be expecting data to act upon.

In the example of FIG. 9, it is shown that following the "act on input" operation 172, then the computer 12g returns to the accomplishment of its primary function (that is, it returns to the "execute primary function" operation 162). However the possibility of even more complicated examples certainly exists. For instance, the programming might be such that certain inputs received from the computer 12f will cause it to abort its previously assigned primary function and begin a new one, or else it might simply temporarily stop and await further input. As one skilled in the art will recognize, the various possibilities for action here are limited only by the imagination of the programmer.

It should be noted that, according to the embodiment of the invention described herein, a given computer 12 need not be interrupted while it is performing a task because another computer 12 is assigned the task of monitoring and handling inputs that might otherwise require an interrupt. However, it is interesting to note also that the computer 12 that is busy handling another task also cannot be disturbed unless and until its programming provides that it look to its ports 38 for input. Therefore, it will sometimes be desirable to cause the computer 12 to pause to look for other inputs. It is important to realize that what is being described here is an example of a paradigm in computing that might be described as "cooperative multi-tasking" wherein tasks that might formerly have been accomplished by a single processor are divided, in new an interesting ways, among several processors.

Figure 10:
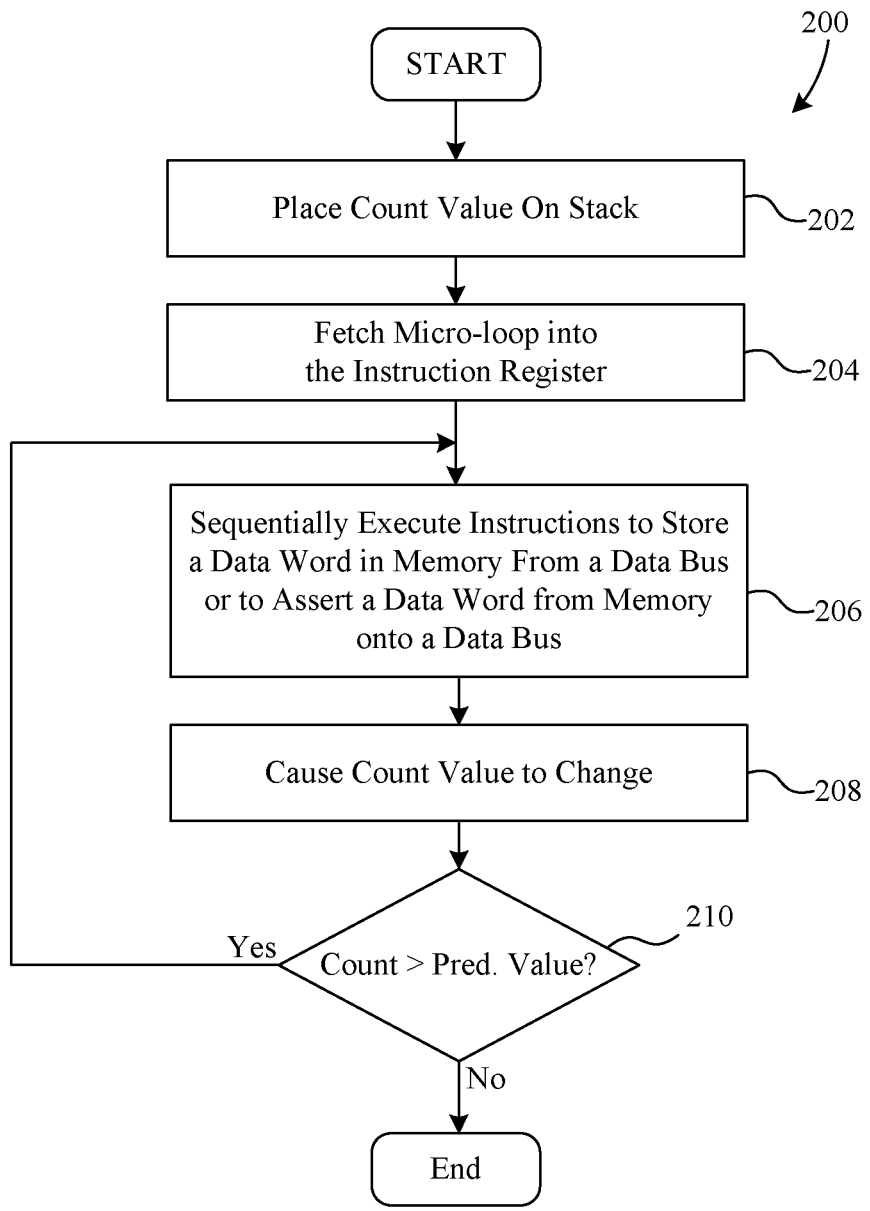
FIG. 10 is a flow diagram depicting an inventive method for one computer to borrow the memory resources of a neighboring computer.

FIG. 10 shows a flowchart summarizing one method 200 according to the present invention where one computer 12 (e.g., computer 12e) uses a micro-loop 100, such as that shown FIG. 6, to borrow the memory resources of another computer 12 (e.g., computer 12b). In a first step 202, computer 12b pushes a count value onto its return stack 28. Then, in a second step 204, the computer 12b fetches an instruction word 48, including a group of instructions 52 (e.g., a micro-loop 100), into its instruction register. According to a particular method, computer 12e of the computer array 10 provides the micro-loop to the computer 12b via a data bus 16 connecting the two computers. Then, in a third step 206, the computer 12b sequentially executes the instructions 52 in the micro-loop. In one instance, where computer 12e wants to borrow memory space in the computer 12b, the instructions cause the computer 12b to store an incoming data word, asserted on to the data bus 16 by computer 12e, to its memory, for example, in its RAM 24. According to another option, where the computer 12e wants to retrieve information that has been previously stored in the computer 12b, the instruction word 48 causes the computer 12b to assert a data word stored in its memory (e.g., RAM 24) on the data bus 16 between the computer 12b and the another computer 12e. Next, in a fourth step 208, count value on the return stack 28 is changed (e.g., decremented). Then, in a fifth step 210, if the count value is greater than a predetermined value (e.g., 0), the computer 12b executes the micro-loop instruction word 48 in the instruction register again. If the count value is not greater than the predetermined value, then method 200 ends.

Various modifications may be made to the invention without altering its value or scope. For example, while this invention has been described herein using the example of the particular computers 12, many or all of the inventive aspects are readily adaptable to other computer designs, other sorts of computer arrays, and the like.

Similarly, while the present invention has been described primarily herein in relation to communications between computers 12 in an array 10 on a single die 14, the same principles and methods can be used, or modified for use, to accomplish other inter-device communications, such as communications between a computer 12 and its dedicated memory or between a computer 12 in an array 10 and an external device.

While specific examples of the inventive computer arrays 10, computers 12, micro-loops 100, direct execution method 120 and associated apparatus, and computer alert method 150 have been discussed herein, it is expected that there will be a great many applications for these which have not yet been envisioned. Indeed, it is one of the advantages of the present invention that the inventive method and apparatus may be adapted to a great variety of uses. All of the above are only some of the examples of available embodiments of the present invention. Those skilled in the art will readily observe that numerous other modifications and alterations may be made without departing from the spirit and scope of the invention. Accordingly, the disclosure herein is not intended as limiting and the appended claims are to be interpreted as encompassing the entire scope of the invention.

INDUSTRIAL APPLICABILITY

The inventive computer arrays 10, computers 12, micro-loops 100, direct execution method 120 and associated apparatus, and computer alert method 150 are intended to be widely used in a great variety of computer applications. It is expected that they will be particularly useful in applications where significant computing power is required, and yet power consumption and heat production are important considerations.

As discussed previously herein, the applicability of the present invention is such that the sharing of information and resources between the computers in an array is greatly enhanced, both in speed a versatility. Also, communications between a computer array and other devices is enhanced according to the described method and means.

Since the computer arrays 10, computers 12, micro-loops 100, direct execution method 120 and associated apparatus, and computer alert method 150 of the present invention may be readily produced and integrated with existing tasks, input/output devices, and the like, and since the advantages as described herein are provided, it is expected that they will be readily accepted in the industry. For these and other reasons, it is expected that the utility and industrial applicability of the invention will be both significant in scope and long-lasting in duration.

We claim:

1. A computer comprising:
a memory;
an instruction area;
a processing unit for executing a plurality of instructions from said instruction area; and
a pulse generator operative to provide a series of pulses for causing said computer to carry out its functions; and wherein
said pulse generator generates a pulse only when it is triggered to do so; and further wherein
each of said pulses generated by said pulse generator causes said processing unit to advance from a presently executed instruction to a next instruction of said plurality of instructions; and
said pulse generator is triggered to generate a next one of said pulses only in response to the occurrence of a predetermined event; and further wherein
said predetermined event occurs when said presently-executed instruction is other than a predetermined type of instruction; and further wherein said computer includes at least one communication port; and said predetermined type of instruction is one of a read instruction for causing said computer to read data from an outside entity via said communication port or a write instruction for causing said computer to write data to an outside entity via said communication port.

2. A computer according to claim 1, wherein said predetermined event occurs when said presently-executed instruction includes a bit having a predetermined value.

3. A computer according to claim 2, wherein said predetermined value is a binary 1.

4. A computer according to claim 2, wherein:
said pulse generator includes an input terminal for receiving the value of said bit as an input; and
said pulse generator is triggered to produce said next one of said pulses responsive to said predetermined value being asserted on said input terminal.

5. A computer according to claim 1, wherein:
said computer includes at least one communication port for communicating with an outside entity; and
said predetermined event occurs when a communication between said computer and said outside entity has been completed via said communication port.

6. A computer according to claim 5, wherein:
an acknowledgement is generated when said communication has been completed;
said pulse generator includes an input terminal for receiving said acknowledgment as an input; and
said pulse generator is triggered to produce said next one of said pulses responsive to receiving said acknowledgment on said input terminal.

7. A computer according to claim 5, wherein:
said computer and said outside entity are in communication via a data path coupled between said communication port of said computer and said outside entity;
said data path includes a plurality of communication status lines and a plurality of data lines;
said computer indicates its readiness to communicate with said outside entity by setting a first communication status line;
said outside entity indicates its readiness to communicate with said computer by setting a second communication status line;
data is transferred between said computer and said outside entity when said first and said second communication status lines are set;
after said data is transferred, signals on both of said communication status lines change; and
said signals changing is said acknowledgment that said communication has been completed.

8. A computer according to claim 1, wherein said pulse generator is triggered to generate a next one of said pulses only in response to the occurrence of one of a plurality of predetermined events.

9. A computer according to claim 8, wherein:
a first one of said plurality of predetermined events occurs when said presently-executed instruction is other than a predetermined type of instruction;
a second one of said plurality of predetermined events occurs when said presently-executed instruction includes a bit having a predetermined value; and
a third one of said plurality of predetermined events occurs when a communication between said computer and an outside entity has been completed via a communication port of said computer.

10. A computer according to claim 1, wherein said plurality of instructions defines a larger instruction word.

11. A computer according to claim 1, wherein:
said computer is one of an array of computers integrated on a single chip; and
a plurality of data paths interconnect said array of computers.

12. A computer according to claim 11, wherein:
said array includes an input port to said array;
said computer monitors said input port while a neighboring computer accomplishes another task, said neighboring computer coupled to said computer via one of said data paths;
each of said data paths is dedicated for communication between an associated pair of said computers; and
responsive to at least one instruction in its programming, said neighboring computer is operative to occasionally pause said another task to determine if said computer has initiated a communication with said neighboring computer.

13. In a computer, a method for causing said computer to temporarily reduce its power consumption, said method comprising:
providing a computer including a memory, an instruction area, a processing unit for executing a plurality of instructions from said instruction area, and a pulse generator operative to provide a series of pulses for causing said computer to carry out its functions;
causing said processing unit to advance from a presently executed instruction to a next instruction of said plurality of instructions only when said pulse generator is triggered into generating a pulse; and
triggering said pulse generator to generate each said pulse only in response to the occurrence of a predetermined event; wherein
said predetermined event occurs when said presently-executed instruction is other than a predetermined type of instruction; and further wherein
said computer includes at least one communication port; and
said predetermined type of instruction is one of a read instruction for causing said computer to read data from an outside entity via said communication port or a write instruction for causing said computer to write data to an outside entity via said communication port.

14. A method according to claim 13, wherein said predetermined event occurs when said presently-executed instruction includes a bit having a predetermined value.

15. A method according to claim 14, wherein said predetermined value is a binary 1.

16. A method according to claim 14, wherein:
said pulse generator includes an input terminal for receiving the value of said bit as an input; and
said step of triggering said pulse generator to generate said pulse includes triggering said pulse generator when said predetermined value is asserted on said input terminal.

17. A method according to claim 13, wherein:
said computer includes at least one communication port for communicating with an outside entity; and
said predetermined event occurs when a communication between said computer and said outside entity has been completed via said communication port.

18. A method according to claim 17, further comprising:
causing an acknowledgement to be generated when said communication has been completed; and wherein
said pulse generator includes an input terminal for receiving said acknowledgment as an input; and said step of triggering said pulse generator to generate said pulse includes triggering said pulse generator responsive to receiving said acknowledgment on said input terminal.

19. A method according to claim 17, wherein:
said computer and said outside entity are in communication via a data path coupled between said communication port of said computer and said outside entity;
said data path includes a plurality of communication status lines and a plurality of data lines;
said computer indicates its readiness to communicate with said outside entity by setting a first communication status line;
said outside entity indicates its readiness to communicate with said computer by setting a second communication status line;
data is transferred between said computer and said outside entity when said first and said second communication status lines are set;
after said data is transferred, signals on both of said communication status lines change; and
said signals changing is said acknowledgment that said communication has been completed.

20. A method according to claim 13, further comprising triggering said pulse generator to generate each said pulse only in response to the occurrence of one of a plurality of predetermined events.

21. A method according to claim 20, wherein:
a first one of said plurality of predetermined events occurs when said presently-executed instruction is other than a predetermined type of instruction;
a second one of said plurality of predetermined events occurs when said presently-executed instruction includes a bit having a predetermined value; and
a third one of said plurality of predetermined events occurs when a communication between said computer and an outside entity has been completed via a communication port of said computer.

22. A method according to claim 13, wherein said plurality of instructions defines a larger instruction word.

23. A method according to claim 13, wherein:
said computer is one of an array of computers integrated on a single chip; and
a plurality of data paths interconnect said array of computers.

24. A computer comprising:
a memory;
an instruction area;
a processing unit for executing a plurality of instructions from said instruction area; and
a pulse generator operative to provide a series of pulses for causing said computer to carry out its functions; and wherein
each of said pulses generated by said pulse generator causes said processing unit to advance from a presently executed instruction to a next instruction of said plurality of instructions; and
said pulse generator is triggered to generate a next one of said pulses only in response to the occurrence of a predetermined event; wherein
said predetermined event occurs when said presently-executed instruction is other than a predetermined type of instruction; and
said computer includes at least one communication port; and
said predetermined type of instruction is a read instruction for causing said computer to read data from an outside entity via said communication port.

25. A computer comprising:
a memory;
an instruction area;
a processing unit for executing a plurality of instructions from said instruction area; and
a pulse generator operative to provide a series of pulses for causing said computer to carry out its functions; and wherein
each of said pulses generated by said pulse generator causes said processing unit to advance from a presently executed instruction to a next instruction of said plurality of instructions; and
said pulse generator is triggered to generate a next one of said pulses only in response to the occurrence of a predetermined event; wherein
said predetermined event occurs when said presently-executed instruction is other than a predetermined type of instruction; and said computer includes at least one communication port; and
said predetermined type of instruction is a write instruction for causing said computer to write data to an outside entity via said communication port.

26. In a computer, a method for causing said computer to temporarily reduce its power consumption, said method comprising:
providing a computer including a memory, an instruction area, a processing unit for executing a plurality of instructions from said instruction area, and a pulse generator operative to provide a series of pulses for causing said computer to carry out its functions;
causing said processing unit to advance from a presently executed instruction to a next instruction of said plurality of instructions each time said pulse generator is triggered into generating a pulse; and
triggering said pulse generator to generate each said pulse only in response to the occurrence of a predetermined event; wherein
said predetermined event occurs when said presently-executed instruction is other than a predetermined type of instruction; and further wherein
said computer includes at least one communication port; and
said predetermined type of instruction is a read instruction for causing said computer to read data from an outside entity via said communication port.

27. In a computer, a method for causing said computer to temporarily reduce its power consumption, said method comprising:
providing a computer including a memory, an instruction area, a processing unit for executing a plurality of instructions from said instruction area, and a pulse generator operative to provide a series of pulses for causing said computer to carry out its functions;
causing said processing unit to advance from a presently executed instruction to a next instruction of said plurality of instructions each time said pulse generator is triggered into generating a pulse; and
triggering said pulse generator to generate each said pulse only in response to the occurrence of a predetermined event; wherein
said predetermined event occurs when said presently-executed instruction is other than a predetermined type of instruction; and further wherein said computer includes at least one communication port; and said predetermined type of instruction is a write instruction for causing said computer to write data to an outside entity via said communication port.

* * * * *